Patented Nov. 29, 1927.

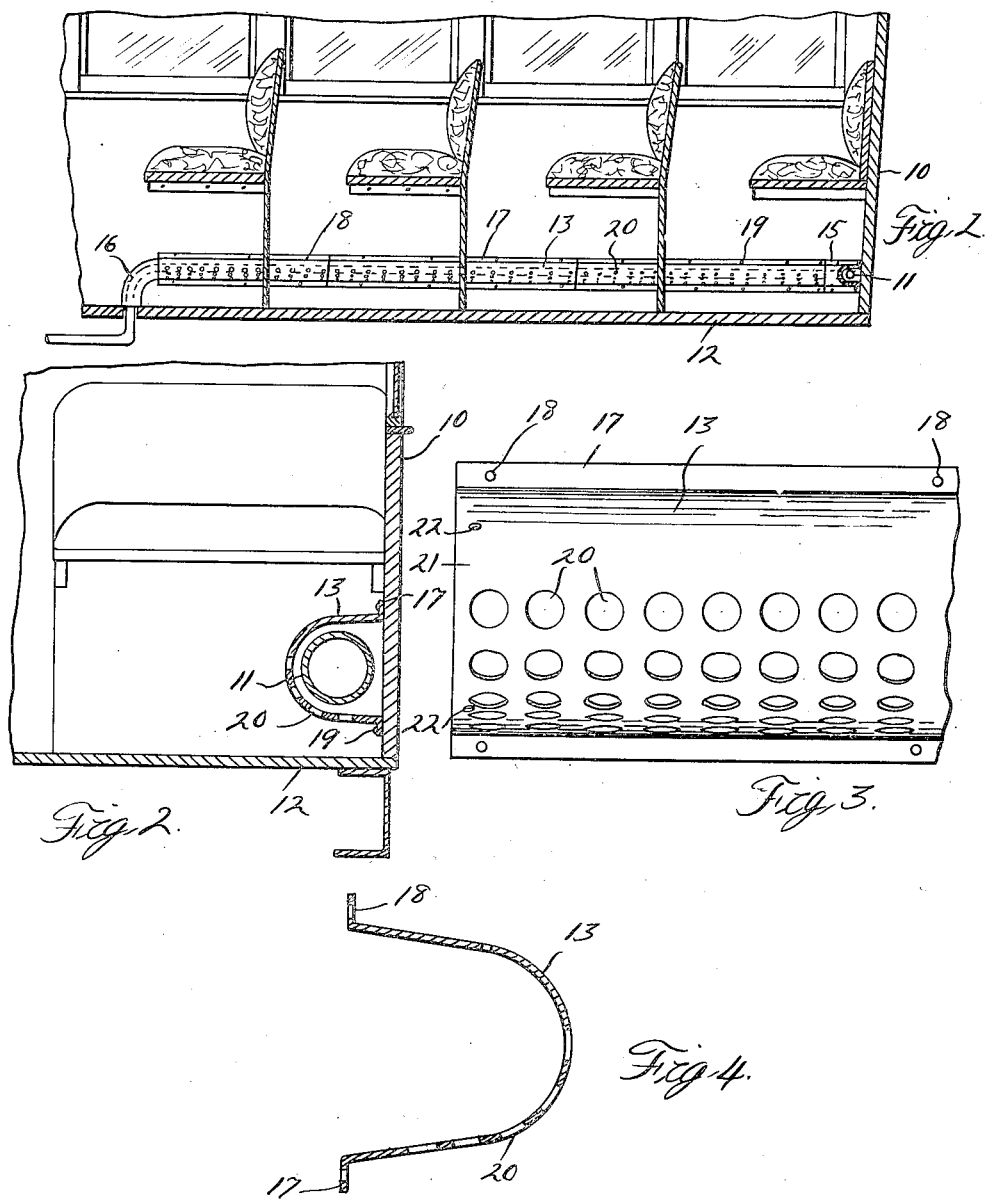

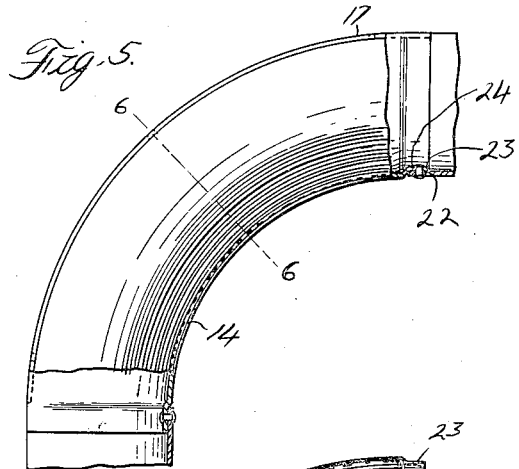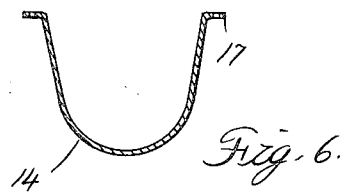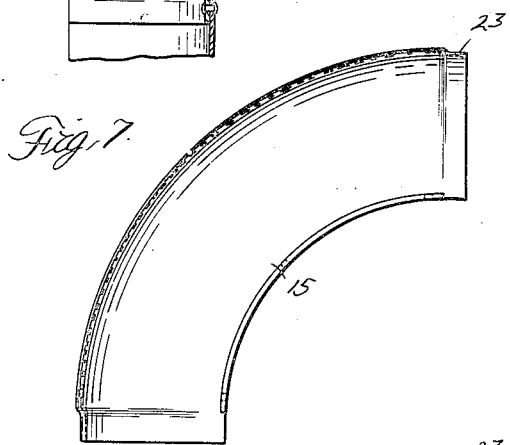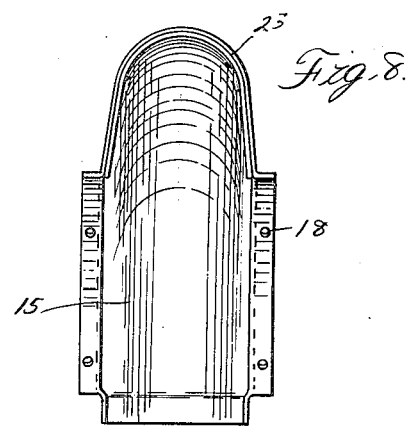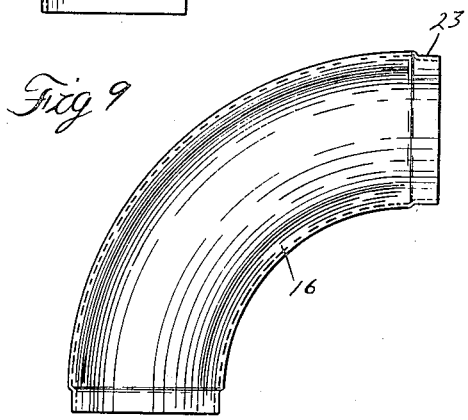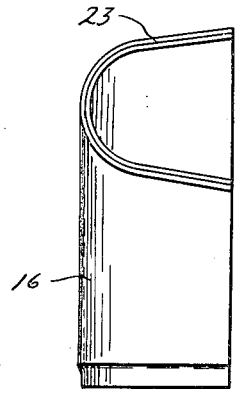

1,650,804

UNITED STATES PATENT OFFICE.

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK.

GUARD FOR HEATER PIPES.

Application filed October 25, 1926. Serial No. 144,154.

This invention relates to guards for heater pipes and more particularly devices of this character for use in connection with motor busses and motor cars wherein the exhaust pipe is extended through the passenger compartment of the vehicle for heating purposes.

One of the primary objects of this invention is to provide pipe housings of the described character which may be manufactured economically and with convenience and dispatch and which furthermore may be sufficiently complete in the number and design of the units employed so as to enable the exhaust pipe to be completely housed irrespective of its length or the nature of its configurations within the vehicle.

Another object of the invention is to provide a guard or housing of this character which while affording a protective covering for the exhaust pipe permits of the ready radiation of the heat therefrom and prevents the accumulation of dirt within the housing.

Another advantage obtainable with the herein described construction is that the pipe as well as the housing may be arranged in spaced relation to the floor of the vehicle, in counter distinction to heretofore known constructions, so as to facilitate cleaning underneath the pipe.

The various objects, advantages and novel details of construction of the invention will be made more clear as this description proceeds, especially when considered in connection with the accompanying drawing, wherein Figure 1 is an elevational view of a portion of a vehicle wall showing the application of my improved guard;

Figure 2 is a fragmentary sectional view through a vehicle or the like and through the exhaust pipe heater and my improved guard;

Figure 3 is a fragmentary elevational view of one of the units;

Figure 4 is a sectional view taken substantially on the plane indicated by 4—4 of Figure 3;

Figure 5 is an elevational view of another one of the units;

Figure 6 is a sectional view taken substantially on the plane indicated by 6—6 of Figure 5;

Figure 7 is a side elevational view of another one of the units employed;

Figure 8 is an end elevational view of the unit illustrated in Figure 7;

Figure 9 is a side elevational view of still another one of the units employed; and Figure 10 is an end elevational view of the structure illustrated in Figure 9.

Referring now particularly to the drawing wherein like reference characters indicate like parts, it will be noted that in Figures 1 and 2 I have illustrated fragmentarily a portion of a motor vehicle or the like having a vertical wall 10 and an exhaust heater pipe 11. Heretofore it was customary to dispose the pipe 11 at the juncture of the wall 10 and the bottom or floor 12 of the vehicle and to inclose the same by a guard or housing which extended diagonally from the floor to the wall. Such a construction involved several disadvantages of note. In the first place dirt and other foreign matter accumulated within the housing and interfered materially with the radiation of the heat from the pipe. It was also found with constructions of this character that the housings could not be made to accommodate the turns or curves in the pipe 11 and frequently the pipe 11 was left exposed at points, for instance, at the end of the vehicle where the heater pipe 11 was given a sharp turn. Furthermore with such heretofore known constructions less surface was exposed to the interior of the vehicle with the result that an inefficient amount of the heat was utilized.

In accordance with the present invention, I propose employing a housing which may, for instance, comprise a series of units or sections including straight sections 13, elbows or curved sections or units 14 and 15, both of which are longitudinally flanged, and unflanged elbow or curved units 16.

Each of the units or sections is of such a construction as to enable the same to be conveniently and economically pressed from sheet metal and is substantially U-shaped in cross section. Each of the units 13, 14 and 15 are provided at their longitudinal edges with lateral outwardly extending flanges 17 apertured at spaced intervals as at 18 for engagement by fastening elements 19 whereby the housing may be secured to the vertical wall 10 of the vehicle. It will be noted that the housing sections cooperate with the said vertical wall to compleetely inclose and house the pipe 11. It will furthermore be noted that with such a construction the pipe 11 as well as the housing may be spaced above the floor 12 to permit of readily cleaning under the housing and to permit of the free circulation of air thereunder.

Each of the units 13 is preferably formed with a plurality of apertures 20 arranged in the lower half of the unit. There are no perforations in the upper or top half of these sections. These perforations permit the circulation of air into the housing where it may come in contact with the heated pipe 11 and also prevent the accumulation of dirt within the housing, as obviously such dirt that accumulates therein may pass through these apertures. The ends 21 of each unit 13 are adapted to engage the adjacent ends of any of the other units and for the purpose of securely attaching the several units one to another apertures 22 are provided wherein fastening means such as rivets may be passed through the overlapping ends of adjacent units to secure the same together.

It will be noted that in Figures 5 to 8, inclusive, elbow units 14 and 15 are illustrated, these units being substantially similar but of different configurations or curves so as to enable the housing to be carried in the desired direction to accommodate the same to turns in the pipe 11. Each of these units is provided with the reduced ends 23 wherein they may telescopically engage the ends 21 of the unit 13. The apertures 24 cooperate with the apertures 22 for rigidly securing the units together.

In Figures 9 and 10 another elbow unit is illustrated which is unflanged and which is employed where it is inconvenient or unnecessary to attach the unit to the adjacent wall structure. Where it is necessary to unite two elbow units a short section or unit 40 similar to unit 13 is employed, the reduced ends of the elbow units telescoping within the ends of such short unit With a construction such as herein described, it is possible to expeditiously and neatly house or inclose the exhaust heater pipes and to also obtain the several advantages in use which have been mentioned hereinbefore. It is likewise possible to manufacture the units comprising this housing in larger quantities with speed and economy, particularly because the several units may be standardized in lengths and shapes such as will accommodate the greatest number of jobs.

What I claim as my invention is:

1. In a guard for heater pipes a plurality of straight and curved sheet metal housing sections or units, each unit being substantially U-shaped in cross section with the ends thereof shaped to fit the ends of the adjacent units and flanges on the longitudinal edges of said units for securing the same to a wall or the like.

2. In a guard for heater pipes, a plurality of interchangeable straight and elbow units, each unit being substantially U-shaped in cross section, the ends of each unit being shaped for telescopic engagement with the adjacent ends of adjacent units and means on the longitudinal edges of certain of the units for attaching the same to a wall or the like.

In testimony whereof I affix my signature.

WILLIAM S. PRITCHARD.